United States Patent Office 2,784,224
Patented Mar. 5, 1957

2,784,224

PURIFICATION OF FUMARIC ACID

Elmer H. Dobratz, Clayton, Mo., assignor to Monsanto Chemical Company, St. Louis, Mo., a corporation of Delaware No Drawing. Application November 19, 1952,
Serial No. 321,506

8 Claims. (Cl. 260—537)

This invention relates to a method for purifying fumaric acid. This method has particular application for effecting a substantial purification of crude fumaric acid produced by the isomerization of crude maleic acid obtained from a process for the manufacture of maleic anhydride by the catalytic oxidation of various hydrocarbons such as butadiene, benzene, toluene, or naphthalene.

There are several sources of crude maleic acid in such process for the manufacture of maleic anhydride by the catalytic oxidation of particular hydrocarbons. For example, when maleic anhydride is produced by the catalytic oxidation of benzene or toluene, the gases from the catalytic converters may be scrubbed with water to form an aqueous solution of crude maleic acid. In the manufacture of phthalic anhydride such as by the controlled catalytic oxidation of naphthalene, a certain amount of maleic anhydride may be formed as a co-product and may be recovered, after the phthalic anhydride is condensed from the gas stream from the catalytic converters, by scrubbing the tail gases containing maleic anhydride with water to form an aqueous solution of crude maleic acid. These crude maleic acid solutions may thereafter be dehydrated to obtain crude maleic anhydride which may be subjected to various purification steps including fractionation to obtain the purified maleic anhydride product. During the various steps in these dehydration operations other aqueous liquors and condensates can be formed containing crude maleic acid in various concentrations.

Fumaric acid can be produced by subjecting an aqueous solution of maleic acid to a catalytic isomerization process. A suitable catalyst is hydrochloric acid and the isomerization can be effected by the heating of an aqueous solution of maleic acid and hydrochloric acid catalyst in the proper proportions. As the isomerization progresses and fumaric acid is formed, the fumaric acid crystallizes out of the reaction mixture due to its low solubility in the reaction mixture, and the fumaric acid crystals are subsequently separated, for example, by filtration or centrifuging.

In view of the fact that maleic acid is generally isomerized to fumaric acid in an aqueous reaction mixture, the various liquors and condensates containing crude maleic acid such as are available from various operations in the production of maleic acid as have been described above appear to be excellent sources of aqueous maleic acid solutions for the manufacture of fumaric acid by subjecting these aqueous maleic acid liquors and condensates directly to a catalytic isomerization operation, with no other treatment of these crude maleic acid solutions than adjusting the maleic acid concentration to an optimum value for catalytic isomerization. However, when fumaric acid is produced directly from such crude maleic acid solutions, the recovered fumaric acid is generally of poor quality, the color of such fumaric acid varying from a dirty gray to tan color rather than the desired and required light colored or substantially white product.

The poor quality fumaric acid which is produced by the isomerization of the maleic acid contained in such crude maleic acid solutions is very difficult to purify, for example, recrystallization of such impure fumaric acid from water results in little improvement in the quality of the fumaric acid. Various methods have been tried for inactivating or removing the contaminants and impurities in these crude maleic acid liquors in order to improve their quality for use in fumaric acid processes in order that a high quality fumaric acid could be obtained directly from these liquors. However, most of these processes have proved to be only partially effective or the chemicals involved for treatment so expensive as to render them impractical.

It is an object of this invention to provide a method for effecting substantial purification of crude fumaric acid. It is a further object of this invention to provide a method for separating fumaric acid from the contaminants and impurities carried along from crude maleic acid from which the fumaric acid is made, particularly where the source of the crude maleic acid is a crude aqueous maleic acid solution obtained from a process for the manufacture of maleic anhydride by the catalytic oxidation of hydrocarbons, such as benzene, toluene, naphthalene, etc.

In my co-pending application, Serial No. 321,507, filed November 19, 1952, I have disclosed a method for purifying crude fumaric acid by converting the crude fumaric acid into an aqueous solution of its alkali metal acid salt, filtering this solution and acidifying the filtrate to reprecipitate fumaric acid in a purer form. This method of purification generally is sufficient to produce a very good quality of fumaric acid. However, in some cases where the crude fumaric acid is unusually impure and contains an excessive quantity of contaminants and impurities, while the method I have described in my co-pending application will result in a substantial improvement in the quality of the fumaric acid, further improvement may be required in order to bring the fumaric acid up to a high grade commercial quality. This is particularly true when the crude fumaric acid is material which has been recovered from the still residues from a maleic anhydride refining still.

According to this invention, crude fumaric acid can be greatly improved in quality by converting the fumaric acid into an aqueous solution of its alkali metal acid salt, adding to this solution a soluble salt of iron, nickel or cobalt, filtering the solution, and treating the filtrate with a strong acid to convert the alkali metal acid fumarate back to fumaric acid which is then recovered as a crystalline material of a substantially improved quality.

Fumaric acid is normally a crystalline material having a very low solubility in water and acidic aqueous medium. However, an alkali metal acid fumarate such as sodium acid fumarate or potassium acid fumarate is readily soluble in water or an aqueous medium having a pH in the range of 2.8 to 5. While the alkali metal acid fumarates are soluble under these conditions, particularly the sodium acid fumarate, a major proportion of the contaminants and impurities originally present in the crude fumaric acid are substantially insoluble under these conditions, and accordingly these impurities can be separated from the solution of the alkali metal acid fumarate by filtration. In using the term filtration, I mean to include not only the separation of solid materials from liquids by passing the liquid through a porous medium, but also equivalent methods of separating solids from liquids such as centrifuging. In many cases, most of the impurities and contaminants of the crude fumaric acid are removed by this procedure, however, in some cases a sufficient quantity of the impurities and contaminants are not removed so as to render further purification of the fumaric acid desirable. In these latter cases, I have discovered that by adding a soluble salt of iron, cobalt or nickel to the solution of the alkali metal acid fumarate prior to filtration results in a still greater quantity of the impurities being removed during the filtration step. The addition of ferric sulfate at this point has produced the most satisfactory results.

In the practice of this invention, it is preferred to convert the crude fumaric acid to an aqueous solution of the sodium acid fumarate by first preparing a slurry of the crude fumaric acid in water, heating this slurry to a temperature of the order of 75° C. and then adding sufficient concentrated sodium hydroxide solution to dissolve the fumaric acid and bring the pH of the aqueous solution to within the range of 2.8 to 5 at which time the fumaric acid has been converted to a solution of predominantly sodium acid fumarate. While the temperature of the solution is held at about this point, a sufficient quantity of a soluble salt of iron, cobalt or nickel, and preferably a soluble salt of iron such as ferric sulfate, is added to the solution so that the solution contains about 0.1 to 0.2% of the metal (as the metal ion) based on the water present in the solution. The quantity of the metal ion added to the solution of the alkali metal acid fumarate can be varied from about 0.05% to 0.5% based on the water present, however, a preferred range is as indicated above, 0.1 to 0.2%, particularly when iron is the metal used, preferably being added as ferric sulfate. Under conditions of pH 2.8 to 5 of the solution, the presence of the metallic ions causes a flocculent insoluble precipitate to form which is readily separated from the solution upon filtration together with the other insoluble impurities. After the soluble metal salt has been added to the solution, it is preferred to hold the solution at a temperature from about 75° C. to the boiling point of the solution for a short period of time, for example, about 15 minutes, before filtering. Upon filtering this solution, preferably while the solution is at a temperature of about 75° C., a major proportion of the contaminants and impurities originally present in the crude fumaric acid is removed together with the precipitate formed from the metal ions. After removal of these suspended solids by filtration, there may remain in the filtrate a small quantity of colored soluble impurities which can effectively be removed by contacting the filtered aqueous solution of the alkali metal acid fumarate with an active adsorption agent such as activated charcoal while the solution is at a temperature of about 75° C. After separating the activated charcoal by filtration, the solution is acidified to pH 1 with a strong acid such as hydrochloric acid, other strong inorganic acids can also be used, thereby converting the alkali metal acid fumarate back to fumaric acid which crystallizes out of solution as a fine white crystalline precipitate. The crystalline fumaric acid is then recovered from the solution by filtration, washed with dilute hydrochloric acid and cold water to remove all traces of metallic ions and dried. The recovered fumaric acid is substantially white.

*Example*

The substantial improvement in quality which may be achieved by the practice of this invention is shown by the following example wherein a very light colored good quality fumaric acid was prepared from crude fumaric acid recovered from the residual tars of a distillation tower for the distillation of maleic anhydride. 250 g. of crude fumaric acid recovered from the tar-like still residue obtained from the distillation of maleic anhydride was slurried into 1200 ml. of water and heated to about 75° C. Sufficient sodium hydroxide was added to the fumaric acid slurry to dissolve the fumaric acid and bring the solution to pH 2.95 whereby the fumaric acid was converted to a solution of predominantly sodium acid fumarate. This solution was maintained at about 75° C. while 47.3 g. of a 20% solution of hydrated ferric sulfate was added and for a period of about 20 minutes thereafter during which time a flocculent precipitate was formed. The solution was then separated from insoluble materials, including the flocculent precipitate, by filtration. A small sample of the filtrate was then acidified to pH 1 with hydrochloric acid to reprecipitate crystalline fumaric acid, which upon recovering, washing with dilute hydrochloric acid and water and drying indicated that a major proportion of the impurities originally present in the crude fumaric acid had been removed. However, the sample of recovered purified fumaric acid had a slight yellow coloration. Thereupon the remainder of the solution (filtrate) containing the sodium acid fumarate was contacted with 8 g. of activated charcoal for 15 minutes while the solution temperature was maintained at about 75° C. The solution was then again filtered to remove the activated charcoal and this second filtrate acidified to pH 1 with concentrated hydrochloric acid to reprecipitate the fumaric acid which was recovered, washed with dilute hydrochloric acid and water to remove all traces of ionic iron and then dried. The fumaric acid thus recovered was substantially white and of very high quality.

When the steps of the above example were repeated excepting the addition of the ferric sulfate, the quality of the crude fumaric acid was substantially improved, however, the fumaric acid thus purified had an off color between light yellow to gray. However, when the steps of the above example are repeated, substituting a soluble salt of nickel or cobalt, or other soluble iron salts, for the ferric sulfate, a high quality, substantially white fumaric acid can be recovered.

What is claimed is:

1. A method for purifying crude fumaric acid comprising adding sufficient alkali metal hydroxide to an aqueous slurry of crude fumaric acid to dissolve the fumaric acid as the alkali metal acid fumarate and bring the aqueous solution to a pH of 2.8 to 5, adding to said aqueous solution a soluble salt of a metal selected from the group consisting of iron, nickel and cobalt, separating insoluble materials from the aqueous solution, acidifying the aqueous solution to pH 1 to precipitate fumaric acid and recovering the fumaric acid of improved purity.

2. A method for purifying crude fumaric acid comprising adding sufficient sodium hydroxide to an aqueous slurry of crude fumaric acid to dissolve the fumaric acid as sodium acid fumarate and bring the aqueous solution to a pH of 2.8 to 5, adding ferric sulfate to said solution, separating insoluble materials from the aqueous solution, acidifying the aqueous solution with hydrochloric acid to pH 1 to precipitate fumaric acid and separating the fumaric acid of improved purity from the acidified solution.

3. The method of claim 2 wherein the solution is contacted with an activated charcoal prior to acidification.

4. A method for purifying crude fumaric acid comprising converting the fumaric acid into an aqueous solution of an alkali metal acid salt of fumaric acid, adding a soluble salt of a metal selected from the group consisting of iron, nickel and cobalt to the solution, separating insoluble materials from the said solution, acidifying said solution with a strong acid to precipitate fumaric acid crystals and recovering relatively pure fumaric acid.

5. A method for purifying crude fumaric acid comprising converting the fumaric acid into an aqueous solution of sodium acid fumarate, adding a soluble iron salt to the said solution, filtering the solution to remove insoluble materials, acidifying the filtered solution to precipitate fumaric acid crystals and recovering the relatively pure fumaric acid.

6. A method for purifying crude fumaric acid comprising converting the fumaric acid into an aqueous solution of sodium acid fumarate having a pH of 2.8 to 5, adding ferric sulfate to said solution, filtering said solution, acidifying the filtered solution with hydrochloric acid to pH 1 to precipitate fumaric acid and recovering the relatively pure fumaric acid from the acidified solution.

7. A method for purifying crude fumaric acid comprising heating a slurry of crude fumaric acid in water to a temperature of the order of 75° C., adding a sufficient quantity of sodium hydroxide to the heated slurry to dissolve the fumaric acid as sodium acid fumarate and bring the aqueous solution to a pH of 2.8 to 5, adding ferric sulfate to the heated solution and thereafter maintaining the temperature of the solution within the range of about 75 to 100° C., filtering the heated solution, acidifying the filtered solution with hydrochloric acid to pH 1 to precipitate fumaric acid and recovering the purified fumaric acid.

8. The method of claim 7 wherein the filtered solution is contacted with an activated charcoal which is then removed prior to acidification.

References Cited in the file of this patent

UNITED STATES PATENTS

| | | |
|---|---|---|
| 293,882 | Hyatt | Feb. 19, 1884 |
| 657,470 | Tweeddale | Sept. 4, 1900 |
| 1,945,246 | Witzel | Jan. 30, 1934 |
| 2,393,352 | Winstrom | Jan. 22, 1946 |
| 2,494,049 | Levin | Jan. 10, 1950 |

OTHER REFERENCES

Sen: J. Phys. Chem., vol. 31, pp. 525–530 (1926).
Weissberger Technique of Organic Chem., vol. V, pp. 188–199, Interscience Publishers, New York (1951).